May 27, 1947.    M. M. LÉVY    2,421,340
DETECTION OF OBSTACLES BY MEANS OF ELECTROMAGNETIC IMPULSES
Filed Sept. 11, 1942    2 Sheets-Sheet 1
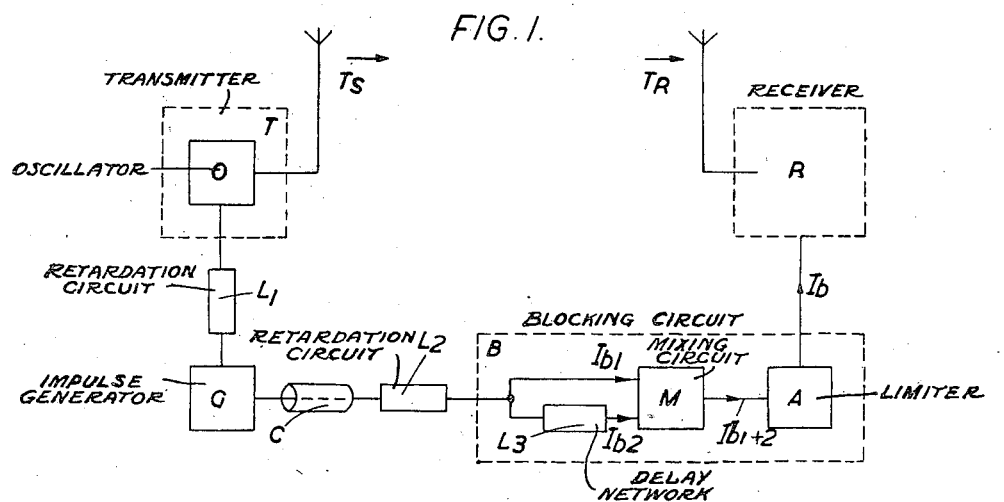
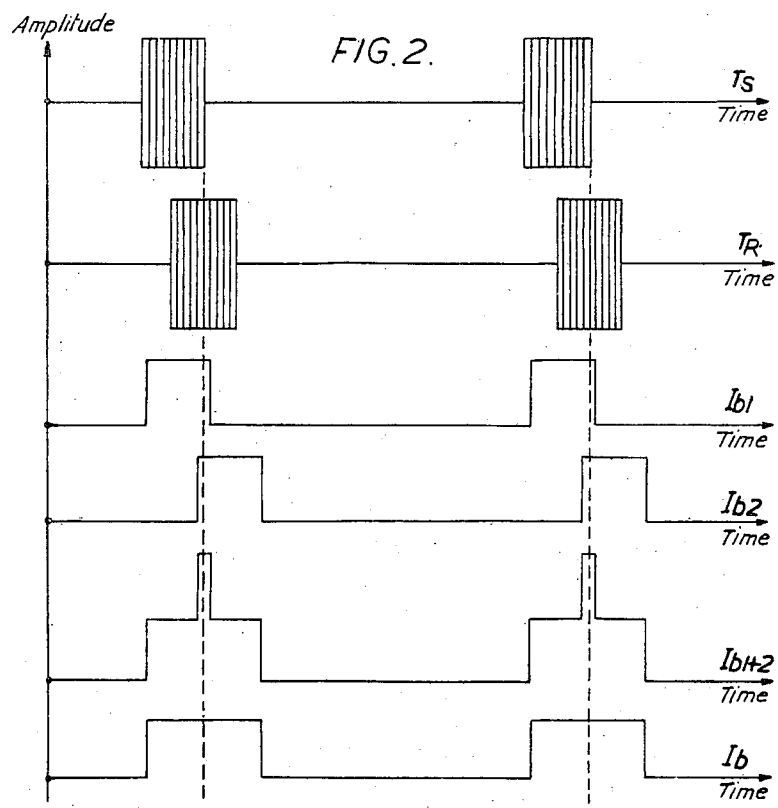

May 27, 1947. M. M. LÉVY 2,421,340
DETECTION OF OBSTACLES BY MEANS OF ELECTROMAGNETIC IMPULSES
Filed Sept. 11, 1942 2 Sheets-Sheet 2

INVENTOR
M. M. Lévy
BY
Loyd Hall Sutton
ATTORNEY

UNITED STATES PATENT OFFICE 2,421,340

DETECTION OF OBSTACLES BY MEANS OF ELECTROMAGNETIC IMPULSES

Maurice Moise Lévy, London W. C. 2, England, assignor, by mesne assignments, to International Standard Electric Corporation, New York, N. Y., a corporation of Delaware Application September 11, 1942, Serial No. 458,063
In Great Britain March 11, 1941

1 Claim. (Cl. 250—1.66)

This invention relates to the improvement of impulse methods of detecting obstacles and particularly to those depending on the reflection of trains of electromagnetic waves.

An arrangement frequently adopted for the detecting and locating of aeroplanes, ships and the like involves a transmitter which radiates impulses, each consisting of a short train of high frequency electromagnetic waves, which after reflection at the obstacle are received on the antenna of a receiver. The distance of the obstacle can then be found by measuring by suitable means the time taken by such impulses in travelling from the transmitter to the receiver by reflection from the obstacle.

The trains of waves are conveniently produced by modulating an oscillator forming part of the transmitter by means of impulses obtained from an impulse generator, which may or may not be separate from the transmitter. The trains of waves have an envelope of shape similar to that of the original impulses. In order to distinguish the trains of waves radiated by the transmitter from the original impulses, these trains will be called "radiated impulses."

In the practice of this method, the distance between the transmitter and receiver is generally small compared with the distance of the obstacle, and as a result the energy of the radiated impulses received by direct transmission will be very large compared with the energy of those received by reflection at the obstacle. If, therefore, the receiver be made sufficiently sensitive to detect the reflected radiated impulses, it will be seriously overloaded by those directly transmitted. One way in which this difficulty may be avoided is based upon a principle whereby the receiver is made inoperative whenever a radiated impulse is received direct from the transmitter.

According to the principal feature of this invention, therefore, the receiver is prevented from operating for the periods of the directly radiated impulses by means of a blocking circuit associated with the receiver, but operated by impulses obtained from the transmitter. If the transmitter is modulated from a separate impulse generator, this can also conveniently supply the impulses for operating the blocking circuit, but if not, the required impulses may be obtained by demodulation at some convenient point in the transmitter. The blocking circuit transforms the original impulses into others having somewhat longer duration, and these transformed impulses are suitably applied to the receiver so that it cannot operate for the period of the transformed impulses. The impulses radiated by the transmitter are at the same time slightly delayed so as to arrive at the receiver during the periods of the transformed impulses when the receiver is inoperative.

The impulse generator, if separate, may be located near the transmitter, in which case impulses for operating the blocking circuit must be transmitted thereto by a separate path which will preferably be a cable. Alternatively, the generator may be located near the receiver in which case impulses for modulating the transmitter must be transmitted similarly by a separate path.

The necessary time registration between the directly radiated impulses arriving at the receiver and the blocking impulses is produced by a delay network inserted either in the path of the impulses which modulate the transmitter, or of those which operate the blocking circuit, or in both paths, according as may be necessary, or convenient, taking into account the delays in other parts of the circuit, as for example, in the cable.

According to another aspect, the receiver is adjusted so that it can detect with the desired sensitivity the radiated impulses after reflection at the obstacle. It remains in this sensitive condition until a directly radiated impulse is about to be received, when the blocking circuit operates and cuts off the plate currents of the first or any other tubes, for example, by suddenly causing the grid-cathode potential to assume a very large negative value. This condition lasts until the blocking impulse disappears, when the receiver returns to the sensitive condition. It is sufficient that the blocking impulse should last long enough to overlap definitely the directly radiated impulse; and it should not be longer than necessary, in order that the period during which the receiver can detect the reflected radiated impulses shall not be unduly encroached upon.

According to a preferred embodiment of the invention, the blocking circuit consists of an arrangement whereby the transformed impulses are obtained by mixing impulses received directly from the generator or transmitter with other similar impulses which have been delayed. If desired, the mixing circuit may be followed by an amplitude limiter of known type for removing the peaks which appear on the transformed impulses.

In one form of the embodiment, the blocking circuit comprises a thermionic tube in series with the cathode circuit of which is connected the input circuit of a delay network, which is preferably composed of several independent sections connected in tandem. This tube is followed by two mixing tubes whose plate circuits are connected to a common load and whose cathodes are connected respectively to the input and output terminals of the delay network, or to the terminals of any two of the independent sections thereof. The operating impulses are applied to the grid of the first tube; and as a result a train of impulses will be applied to the cathode of the first mixing tube, and a similar delayed train will be applied to the cathode of the second mixing tube. The mixed impulses will be obtained in the common load.

With this arrangement, the transformed impulses so obtained will have the same sign as the original impulses. Moreover, by connecting the grids instead of the cathodes of the mixing tubes to the delay network the transformed impulses may be given the opposite sign.

In another form of the embodiment, the blocking circuit comprises only one tube having the input circuit of the delay network connected in series with the cathode circuit; the output terminals of the network are left unconnected. When the operating impulses are applied to the grid of the tube, similar impulses appear in the cathode circuit across the input terminals of the delay network, and the delayed impulses appear at the same input terminals after reflection at the unconnected output terminals. The mixing accordingly occurs in the cathode circuit of the tube, and the transformed impulses may accordingly be obtained from the cathode circuit.

In either of these arrangements the mixing circuit may be followed if desired by an amplitude limiter as already mentioned, or by further stages of amplification (which may be of the cathode follower type), or both.

The features of the invention will be more clearly understood from the explanation which will be given with reference to the attached sketches in which:

Fig. 1 shows in schematic form an arrangement for detecting obstacles;

Fig. 2 shows a number of wave forms of impulses;

Figure 3:
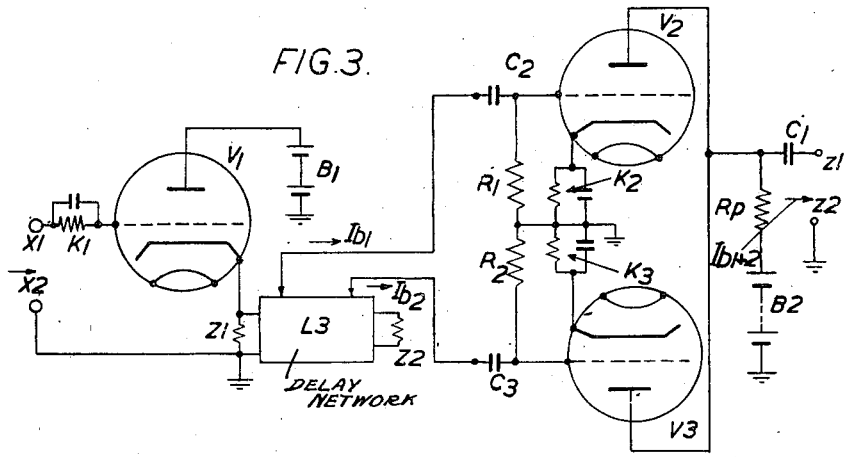
Fig. 3 shows the details of a blocking circuit.

In Fig. 1 is shown schematically an arrangement which exhibits the principles of the invention. The block T represents a transmitter for radiating impulses and the block R represents the receiver on which the radiated impulses reflected from the object to be located are detected. T and R are placed rather near together, for example, 100 metres apart. This system will enable very distant obstacles to be located according to the power available at the transmitter. If, for example, the transmitter has a peak power of 400 kilowatts, an aeroplane 100 kilometres away could be detected.

Under conditions similar to those just described, the power level of the radiated impulses received directly from the transmitter may be more than 60 decibels higher than the power level of those reflected from the object. Thus if the receiver is made sufficiently sensitive to detect the reflected radiated impulses it will be very seriously overloaded by those directly received. In order to prevent this a blocking circuit B shown in Fig. 1 is provided, the function of which is to prevent the high level radiated impulses from passing through the receiver R, while leaving it in normal condition for detection of those which have been reflected. The manner in which the blocking circuit operates will be explained with reference to Fig. 2.

The transmitter T sends out trains of waves of very high frequency, the envelope of which has the form of impulses which are repeated periodically (see $T_s$ Fig. 2). These trains of waves may be obtained by modulating the transmitter by periodical rectangular impulses similar to $I_{b1}$. The width of these impulses is practically equal to the maximum width of the train of waves. It is easy to transform a train of high frequency waves like $T_s$ back into the rectangular impulses by means of a detector. The trains of waves $T_R$, Fig. 2 which are the radiated impulses are delayed with respect to the waves $T_s$ due to the time of propagation between the transmitter and the receiver (see $T_R$ Fig. 2). In order to prevent them from reaching the tubes of the receiver and saturating them, the blocking circuit B is used as already mentioned. The function of this circuit is to block the receiver a little before the arrival of each directly radiated impulse, and to unlock it a little after the end thereof.

The blocking of the receiver is carried out by means of impulses $I_b$ produced by the blocking circuit B and transmitted to the first or all of the tubes of the receiver R. These impulses may be applied to the cathodes (or the grids) of any of the tubes and are so poled as to reduce the plate currents to zero. The impulses $I_b$ are produced by the blocking circuit so as to overlap the radiated impulses $T_R$ as shown in Fig. 2, that is to say, each blocking impulse appears a little before the corresponding radiated impulse $T_R$ and disappears a little after.

In order to produce these impulses the process is as follows:

By a method to be explained below, impulses $I_{b1}$ (Fig. 2) sent from the generator G to the blocking circuit arrive at the receiver R a little before the corresponding radiated impulses $T_R$. New impulses $I_{b2}$ derived from the impulses $I_{b1}$ are produced in the blocking circuit with a suitable delay so that they disappear a little after the disappearance of the corresponding radiated impulses $T_R$. Impulses $I_{b1+2}$, the sum of impulses $I_{b1}$ and $I_{b2}$ are then produced. It is arranged so that the maximum width of these impulses shall be less than double the width of the impulses $T_R$. Finally, the peaks of the impulses $I_{b1+2}$ may be cut off if desired by an amplitude limiter A, for example. The blocking impulses $I_b$ are then obtained.

Referring to Fig. 1, the generator G modulates the oscillator O of the transmitter, and at the same time sends impulses to the blocking circuit B, through a cable C, for example. The impulses delivered to the transmitter and blocking circuit are retarded by means of artificial lines $L_1$ and $L_2$, the delays produced by those lines being adjusted so that the radiated impulses $T_R$ received at the receiver are slightly behind the impulses transmitted to the blocking circuit, as indicated by $T_R$ and $I_{b1}$ in Fig. 2. In the adjustment of these artificial lines it is necessary to take into account all the delays produced by the transmission between the transmitter and receiver, including, for example, the delay produced in the cable. While it is usually convenient to use two artificial lines, only one of them is actually essential for the operation of the circuit.

The generator G could also be located at the other end of the cable near the receiver. In this case the impulses for modulating the transmitter would be sent through the cable.

When there is no separate generator, the modulating impulses will be generated in the transmitter itself. It is then necessary to obtain the impulses for operating the blocking circuit by detection of the modulated impulses obtained from some convenient point in the transmitter circuit. In such a case also, the artificial line $L_1$ has to be connected between the transmitter and the antenna.

The blocking circuit B is represented schematically in Fig. 1. A mixing circuit M receives two trains of impulses, the impulses $I_{b1}$ and the impulses $I_{b2}$, these last impulses being obtained by transmitting the impulses $I_{b1}$ through a delay network $L_3$. The mixture of these two types of impulses has the form of the impulses $I_{b1+2}$ of Fig. 2, if the delay in the network $L_3$ is suitably chosen. The peaks of these impulses may be cut off if desired (though it is not necessary for the operation of the circuit) by following the mixing circuit with a suitably adjusted amplitude limiter A, so producing the impulses $I_b$.

An example of a blocking circuit in which the principles just explained are carried out is shown in Fig. 3. It consists essentially of a tube $V_1$ to which the impulses from the generator are applied, followed by two mixing valves $V_2$ and $V_3$, the plate circuits of which are connected to a common load $R_p$. These tubes are preferably of the type having indirectly heated cathodes as shown, and can have any number of electrodes, although triodes are indicated. $B_1$ and $B_2$ indicate the anode potential supplies for the tubes, $R_1$ and $R_2$ are the grid resistances for the tubes $V_2$ and $V_3$ and $K_1$, $K_2$ and $K_3$ are the usual condenser-resistance biassing circuits connected to these tubes. The heating circuits have been omitted for clearness. The output is taken from terminals $z_1$ and $z_2$ through blocking condenser $C_1$.

The valve $V_1$ has connected between the cathode and earth, the input circuit of a delay network $L_3$ to the input and output terminals of which are connected impedances $Z_1$ and $Z_2$, which have preferably values such that the delay network will be terminated at both ends by its own image impedance, in order to avoid undesirable reflections. The network will preferably consist of a number of separate sections connected in tandem, to the terminals of any of which sections external connections may be made.

The grids of tubes $V_2$ and $V_3$ are connected respectively to the terminals of any two such sections through blocking condensers $C_2$ and $C_3$ as indicated in Fig. 3. As a particular case, for example, these grids may be connected respectively to the input and output terminals of the delay network itself.

Suppose now impulses $I_s$ similar to those used for producing the radiated impulses $T_s$ shown in Fig. 1 be applied to the input terminals $x_1$, $x_2$ of the blocking circuit, and so poled that they make the grid of tube $V_1$ positive with respect to earth. Impulses $I_{b1}$ having the same sign, but delayed by transmission through part of the network $L_3$ will be applied to the grid of tube $V_2$. Impulses $I_{b2}$ also having the same sign, but more delayed by transmission through a larger part of the network $L_3$ will be applied to the grid of tube $V_3$. These impulses $I_{b1}$ and $I_{b2}$ will be mixed together in the resistance $R_p$ and impulses of the type $I_{b1+2}$ will be obtained from the output terminals $z_1$ and $z_2$. These impulses will however be reversed in sign with respect to the original impulse $I_s$.

As an alternative, the cathodes instead of the grids of $V_2$ and $V_3$ may be connected to the points in the network $L_3$, in which case the cathode circuits $K_2$ and $K_3$ will be omitted. With this arrangement the impulses $I_{b1+2}$ obtained at the output terminals $z_1$ and $z_2$ will have the same sign as the original impulse $I_s$.

Fig. 3 shows only one possible arrangement of the circuit. Several others will occur to those skilled in the art; for instance, the delay network may be connected in the plate circuit instead of in the cathode circuit of tube $V_1$; and the biassing circuit $K_1$ could be connected in series with the cathode instead of in series with the grid.

Figure 4:
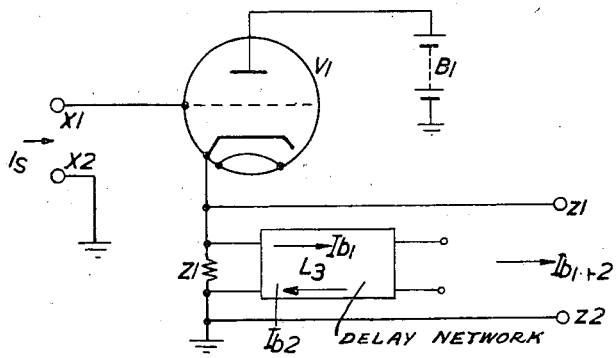
Fig. 4 shows the details of another blocking circuit.

In Fig. 4 is shown a simpler arrangement involving a single tube $V_1$, in series with the cathode circuit of which is connected the input circuit of a delay network $L_3$. The plate potential supply is represented by the battery $B_1$, and there is no load in the anode circuit. The delay network $L_3$ should preferably have connected to its input terminals an impedance $Z_1$ of such value that the network is terminated in its image impedance. The output terminals of the network should be left unconnected. The impulses $I_s$ from the impulse generator are connected to the grid of the tube and a similar impulse $I_{b1}$ then appears across the impedance $Z_1$. This impulse is transmitted through the delay network and is reflected at the output terminals returning to the input terminals as the impulse $I_{b2}$ after a delay corresponding to traversing the network twice. The reflected impulse $I_{b2}$ appears at the input terminals with the same sign as the original impulse $I_s$ and the mixing takes place in the impedance $Z_1$. The output terminals $z_1$ and $z_2$ are connected across $Z_1$, and the lengthened impulse $I_{b1+2}$ is obtained therefrom.

The lengthened impulses obtained by either of these methods may be applied directly to the tubes of the receiver R (Fig. 1); but if desired, the circuits of Figs. 3 or 4 may be followed by an amplitude limiter A so adjusted as to cut off the peaks of the impulses $I_{b1+2}$ in order to produce the impulses $I_b$: and also, further stages of amplification may be added if desired, with or without the amplitude limiter, and such stages may conveniently comprise tubes connected as cathode followers.

What is claimed is:

System for obstacle detection by electromagnetic waves comprising a transmitter for transmitting impulses consisting of short trains of electromagnetic waves, a receiver for receiving said waves after reflection by an object, a blocking circuit for rendering said receiver inoperative comprising a thermionic tube having an impedance in its output circuit, a delay network the output terminals of which are left unconnected and the input terminals of which are connected across said impedance, means for deriving from said transmitter impulses of the same wave form and periodicity as said transmitted impulses and for applying them to the input of said tube, and an output circuit connected across said impedance and extending to said receiver.

MAURICE MOISE LÉVY.

REFERENCES CITED

The following references are of record in the file of this patent:

UNITED STATES PATENTS

| Number | Name | Date |
|---|---|---|
| 1,924,174 | Wolf | Aug. 29, 1933 |
| 1,982,271 | Turner | Nov. 27, 1934 |
| 2,055,883 | Terry | Sept. 29, 1936 |
| 2,083,344 | Newhouse et al. | June 8, 1937 |

FOREIGN PATENTS

| Number | Country | Date |
|---|---|---|
| 113,233 | Australia | June 2, 1941 |